United States Patent
Quan et al.

(10) Patent No.: US 12,535,101 B2
(45) Date of Patent: Jan. 27, 2026

(54) BEARING FOR FASTENING ROTATING SHAFTS ON SUPPORT POSTS

(71) Applicant: TRINA SOLAR, S.L.U., Madrid (ES)

(72) Inventors: Peng Quan, Madrid (ES); Juan Manuel Gómez Garcia, Madrid (ES); Jose Ignacio Lopez Ayarza, Madrid (ES); Felix Sabando Fraile, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 304 days.

(21) Appl. No.: 18/320,678

(22) Filed: May 19, 2023

(65) Prior Publication Data

US 2023/0407908 A1    Dec. 21, 2023

(30) Foreign Application Priority Data

Jun. 21, 2022  (ES) .................................. 202231050

(51) Int. Cl.
*F16C 11/06*       (2006.01)
(52) U.S. Cl.
CPC ................................. *F16C 11/0695* (2013.01)
(58) Field of Classification Search
CPC .......... H02S 20/10; H02S 20/20; H02S 20/32; H02S 30/10; H02S 30/20; F24S 23/245; F24S 30/40; F24S 30/425; F24S 50/20; Y02E 10/47; Y02E 10/50; F16C 11/04
See application file for complete search history.

(56) References Cited

U.S. PATENT DOCUMENTS

| | | | | |
|---|---|---|---|---|
| 5,454,277 | A | * | 10/1995 | Imase .................... F16H 27/045 74/464 |
| 6,073,503 | A | * | 6/2000 | Matsuno ................. B65B 65/02 74/53 |
| 8,459,249 | B2 | * | 6/2013 | Corio .................... F24S 30/425 126/606 |
| 9,303,684 | B2 | * | 4/2016 | Clavijo Lumbreras ...... F16C 11/0695 |
| 9,482,449 | B2 | * | 11/2016 | Cole ..................... F24S 30/425 |
| 9,581,678 | B2 | * | 2/2017 | Corio ..................... F24S 40/00 |
| 9,806,669 | B2 | * | 10/2017 | Michotte De Welle ...... F16M 11/10 |
| 9,819,301 | B2 | * | 11/2017 | Ripoll Agullo ....... F16C 33/046 |
| 9,979,346 | B2 | * | 5/2018 | Song ..................... F24S 30/425 |

(Continued)

FOREIGN PATENT DOCUMENTS

| | | |
|---|---|---|
| ES | 1141282 U | 7/2015 |
| ES | 2651916 A1 | 1/2018 |

(Continued)

*Primary Examiner* — Daniel J Wiley
(74) *Attorney, Agent, or Firm* — LUCAS & MERCANTI, LLP

(57) ABSTRACT

A bearing for fastening rotating shafts on support posts is provided, having a support (1) by which a clamp (3) is fastened on the support post (2), incorporating in the clamp (3) a ball joint (4.1) through which the rotating shaft (5) to be fastened passes, wherein the support (1) is made up of two complementary portions, which are axially attached facing one another, retaining the support post (2) between them, whereas on the assembly of the mentioned support (1) there is fixed a clamp (3) which houses internally a spherical ball joint (4.1) which determines a central opening through which the rotating shaft (5) to be fastened passes.

5 Claims, 7 Drawing Sheets

(56) References Cited

U.S. PATENT DOCUMENTS

| | | | |
|---|---|---|---|
| 10,584,902 B2* | 3/2020 | Ros Ruiz | F24S 80/00 |
| 10,605,489 B2* | 3/2020 | Worden | F24S 30/425 |
| 10,944,354 B2* | 3/2021 | Ballentine | H02S 30/10 |
| 11,035,591 B2* | 6/2021 | Childress | F16C 17/10 |
| 11,114,975 B2* | 9/2021 | Mukherjee | H02S 20/32 |
| 11,387,771 B2* | 7/2022 | Au | F16H 19/001 |
| 11,711,051 B2* | 7/2023 | Kresse | H02S 20/10 |
| | | | 136/246 |
| 12,072,124 B2* | 8/2024 | Achaerandio | F24S 23/74 |
| 2007/0274618 A1* | 11/2007 | Sandin | F16C 33/046 |
| | | | 384/212 |
| 2011/0253195 A1* | 10/2011 | Kim | H02S 20/32 |
| | | | 136/246 |
| 2013/0039610 A1* | 2/2013 | Schneider | F24S 25/70 |
| | | | 384/428 |
| 2014/0338659 A1* | 11/2014 | Corio | F24S 30/428 |
| | | | 126/714 |
| 2015/0207452 A1* | 7/2015 | Werner | F24S 50/20 |
| | | | 136/246 |
| 2015/0234031 A1* | 8/2015 | Corio | F24S 30/425 |
| | | | 250/203.4 |
| 2016/0013751 A1* | 1/2016 | Michotte De Welle | H02S 20/32 |
| | | | 136/246 |
| 2016/0190980 A1* | 6/2016 | Sun | H02S 20/10 |
| | | | 136/246 |
| 2016/0218663 A1* | 7/2016 | Werner | F24S 30/425 |
| 2018/0091088 A1* | 3/2018 | Barton | F24S 30/425 |
| 2019/0052224 A1* | 2/2019 | Schatz | H02S 20/10 |

FOREIGN PATENT DOCUMENTS

| | | |
|---|---|---|
| ES | 2709659 T3 | 4/2019 |
| ES | 2776736 T3 | 7/2020 |
| ES | 1277944 U | 9/2021 |

* cited by examiner

BEARING FOR FASTENING ROTATING SHAFTS ON SUPPORT POSTS

CROSS-REFERENCE TO RELATED APPLICATION

This application claims priority of Spanish Patent Application No. U202231050, filed Jun. 21, 2022, the contents of which are incorporated herein by reference.

TECHNICAL FIELD

The present invention relates to the sector of renewable energies, particularly to solar tracker installation, proposing a bearing for assembling the rotating shaft of solar trackers by fastening same on support posts in the installation.

STATE OF THE ART

Since the beginning of the development of photovoltaic modules, the technology has evolved such that said photovoltaic modules can be installed on a metallic framework, one of the elements of which is a rotating shaft that allows a movement to orient the photovoltaic modules towards the position of the sun to better harness solar energy, with the fastened rotating shaft being arranged to that end on support ports by means of assembly bearings, said bearings allowing the rotation of the rotating shaft so that it may follow the trajectory of the sun.

The state of the art includes a series of documents that disclose different types and designs of bearings for assembling the rotating shaft of solar trackers, all of them sharing drawbacks in terms of requiring a large number of elements that complicate assembly, increasing maintenance, and making it more expensive, in addition to the fact that some designs are so complex that manufacturing is complicated and expensive.

Such is the case, for example, of documents ES2651916 and ES2709659, which present bearings that do not adapt to the different profiles that a support post may have in a solar tracker. Furthermore, these bearings are not capable of supporting large loads, so their range of applications is considerably reduced.

Other conventional bearing solutions, such as those of documents ES2776736, ES1141282, and ES1277944, do not allow the independent replacement of the component elements, which means that when there is a need to replace a part, it is necessary to acquire a complete bearing, making the maintenance of the installations of application more expensive.

Current solar tracker assembly techniques also use a single bearing for fastening the rotating shaft on each support post, which leads to the drawback of obtaining less stability and strength to support the weight of the solar tracker photovoltaic assembly, resulting in lower reliability in tracking the trajectory of the sun and worse system performance.

Due to all of the above, there is a need to develop a solution which solves the problems and drawbacks posed by the current techniques during assembly of a solar tracker installation.

OBJECT OF THE INVENTION

The object of the present invention relates to a bearing for fastening rotating shafts on support posts, for example, for application during assembly of a solar tracker installation, said bearing being developed with embodiment features that simplify manufacturing and assembly and reduce their costs, with the assembly being able to be adapted at the same time to all types of support post profiles.

To achieve such objectives, the present invention proposes a simple and versatile bearing comprising a support for fastening to a support post, for example, during assembly of a solar tracker installation, there being fixed on the mentioned support a clamp fastening a ball joint the outer face of which is spherical in correspondence with the inside of the clamp, whereas said ball joint determines, on the inside, an opening which corresponds with the shape of the section (square, hexagonal, circular, etc.) of a rotating shaft to be fastened which goes through said opening.

The support for fixing on the support post is made up of two complementary parts facing one another, between which the support post is retained during the assembly of application, while the clamp is also made up of two complementary parts facing one another, between which the ball joint is fastened by retention, said ball joint being in turn made up of two complementary portions determining therebetween the inner opening through which the rotating shaft to be fastened passes.

The clamp can be formed by a structure with a closed annular configuration made up of the two complementary parts that are facing one another, however, it is also contemplated for the clamp to comprise two sectors which are attached to form the annular configuration. The assembly of the bearing and the incorporation on the rotating shaft to be fastened are more convenient with this configuration. The rotating shaft can be incorporated between the two separated sectors of the clamp, in the same way as the ball joint, to then close the ball joint assembly and the clamp assembly on the rotating shaft, whereby the difficulty of having to slide the rotating shaft through the inside of the ball joint until the assembly position is avoided.

According to another aspect of the invention, a bearing system which, during the assembly of application on a rotating shaft to be fastened, has two associated bearings for fastening on the same support post by means of an attachment part, is contemplated, thereby achieving the advantage of being able to support higher loads for photovoltaic plants with large dimensions, resulting in a highly competitive solution.

With the embodiment of the bearing object of the invention, the advantage of a simple manufacturing, assembly, and maintenance is therefore obtained, which results in cost savings; in addition to enabling adaptability to all types of profiles of the support posts and the rotating shafts to be fastened, with versatility to enable supporting a large range of loads. Therefore, with the embodiment of said bearing object of the invention, the problems and drawbacks of conventional bearing solutions used for fastening rotating shafts in applications, such as solar tracker orientation assembly, are eliminated, improving the functionality of the systems of application.

DESCRIPTION OF THE FIGURES

Drawings that are merely explanatory but non-limiting are included to support the description of the invention.

DETAILED DESCRIPTION OF THE INVENTION

The proposed invention relates to a bearing for fastening rotating shafts on support posts, for example, during assembly of a solar tracker installation, with an embodiment which improves the functionality of the conventional installations of said application.

Figure 1:
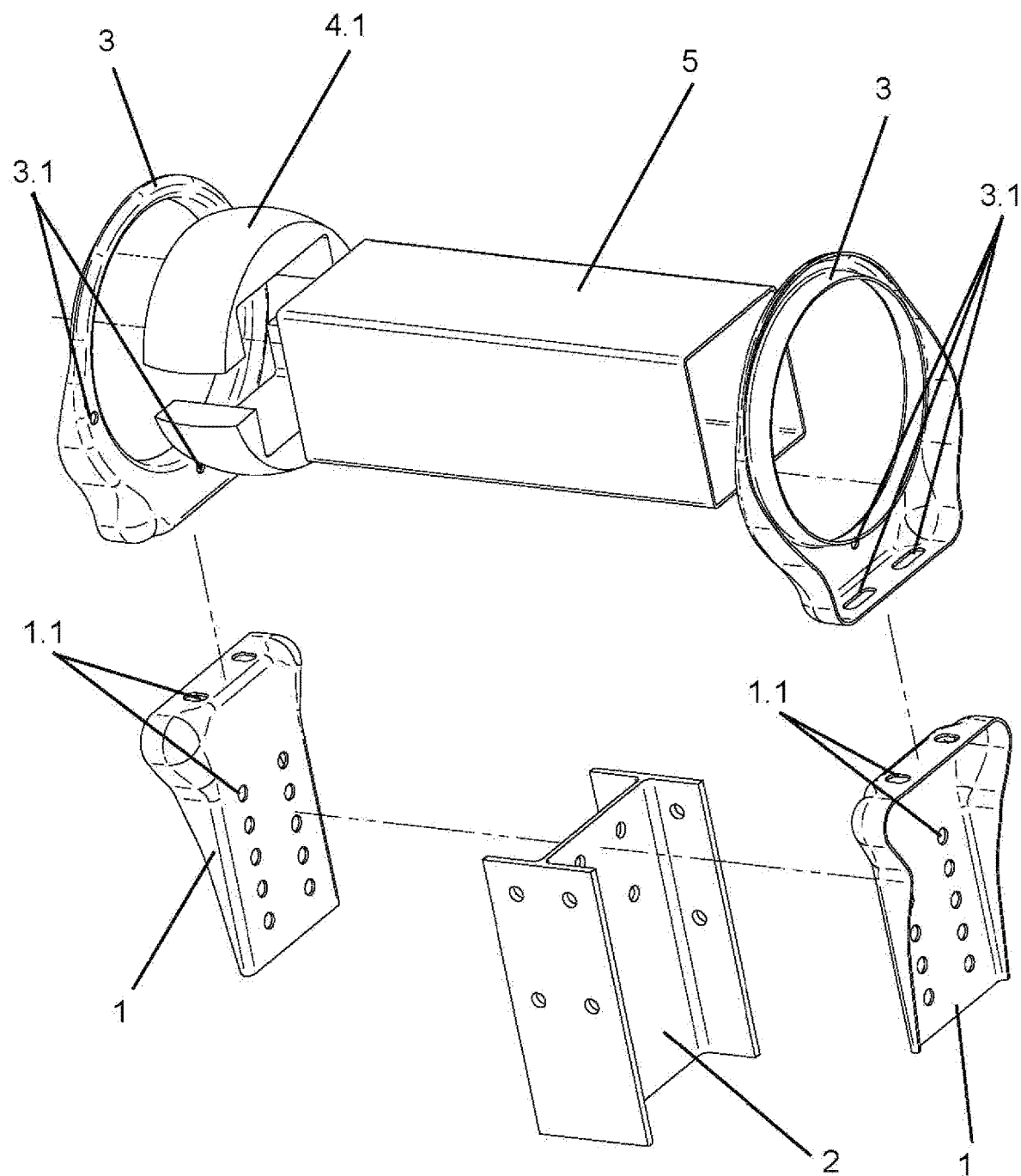
FIG. 1 is an exploded perspective view of a practical embodiment of a bearing according to the object of the invention.
Figure 2:
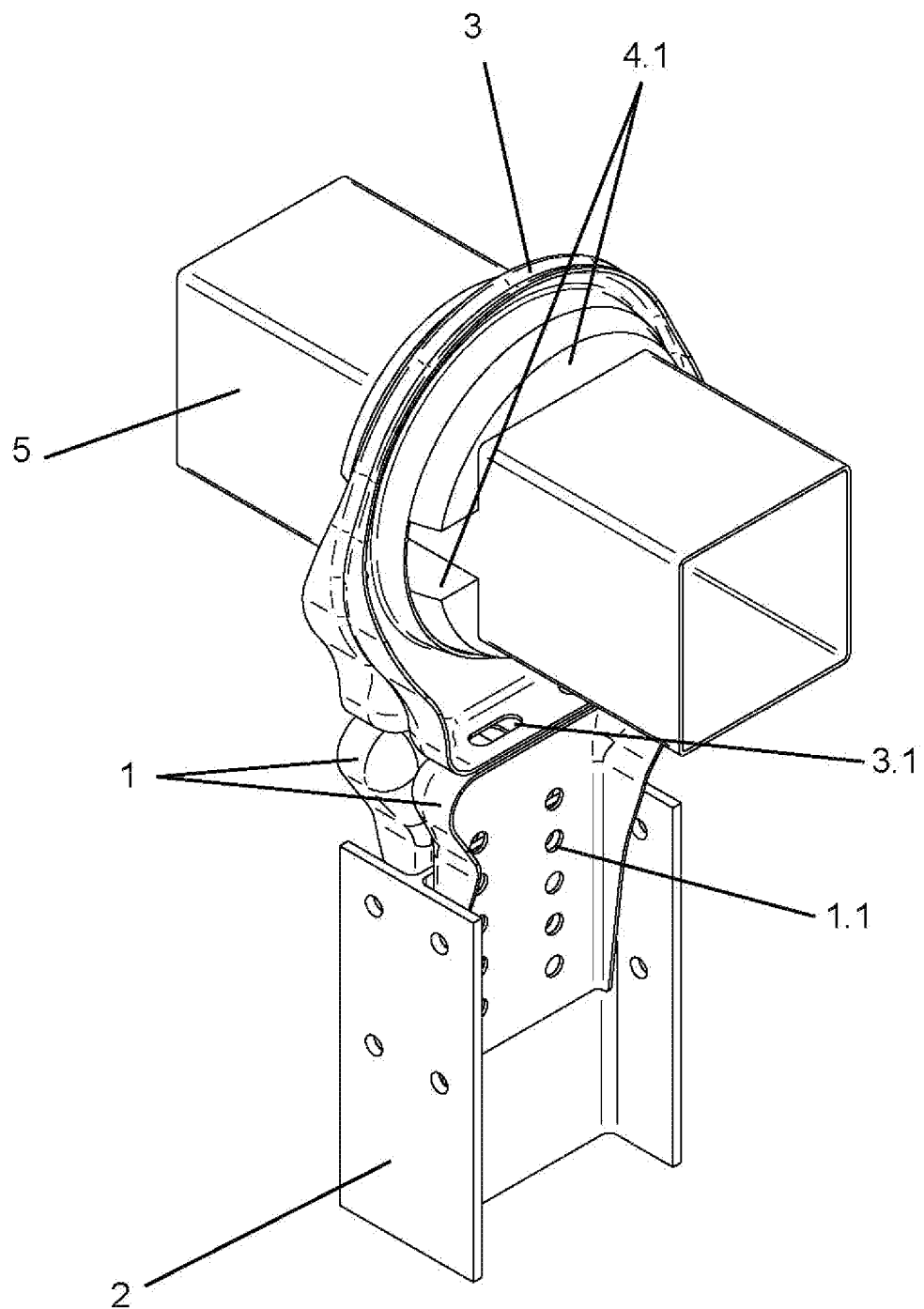
FIG. 2 is a perspective view of the bearing of FIG. 1 assembled.

As can be seen in FIG. 1, said bearing object of the invention comprises a support (1) made up of two complementary portions which are arranged axially facing one another, with the direction of the rotating shaft (5) being considered the axial direction, and with the portions being fixed by means of screws or similar means through perforations (1.1). Fastening on a support post (2) is established by means of the attachment of said complementary portions, with the post being retained and held between the portions. Meanwhile, on the assembly of the support (1) there is fixed a clamp (3), which is made up of two axially facing parts that are fixed to one another by means of screws or similar means through perforations (3.1). The clamp (3) with an annular configuration houses therein a ball joint (4.1) which has a spherical surface externally in correspondence with the inner seating of the annular configuration of the clamp (3), whereas in the central area, said ball joint (4) determines an opening having a configuration corresponding with the section of the rotating shaft (5) to be fastened in the application of the bearing. The ball joint (4) is preferably made up of two complementary portions, which are attached to one another determining between them the central opening for the passage of the rotating shaft (5) through the ball joint (4).

In this way, the assembly of the bearing in the installation of application, such as for fastening the rotating shaft (5) of a solar tracker, can be performed by first fixing the support post (2) on the ground of the installation site, to then incorporating the support (1) by means of attaching its complementary portions, retaining the post (2) between them, and once in this state, fixing the clamp (3) on the support (1) with the ball joint (4) included between the component parts of said clamp (3) once the ball joint (4) is arranged on the rotating shaft (5) to be fastened.

Figure 3:
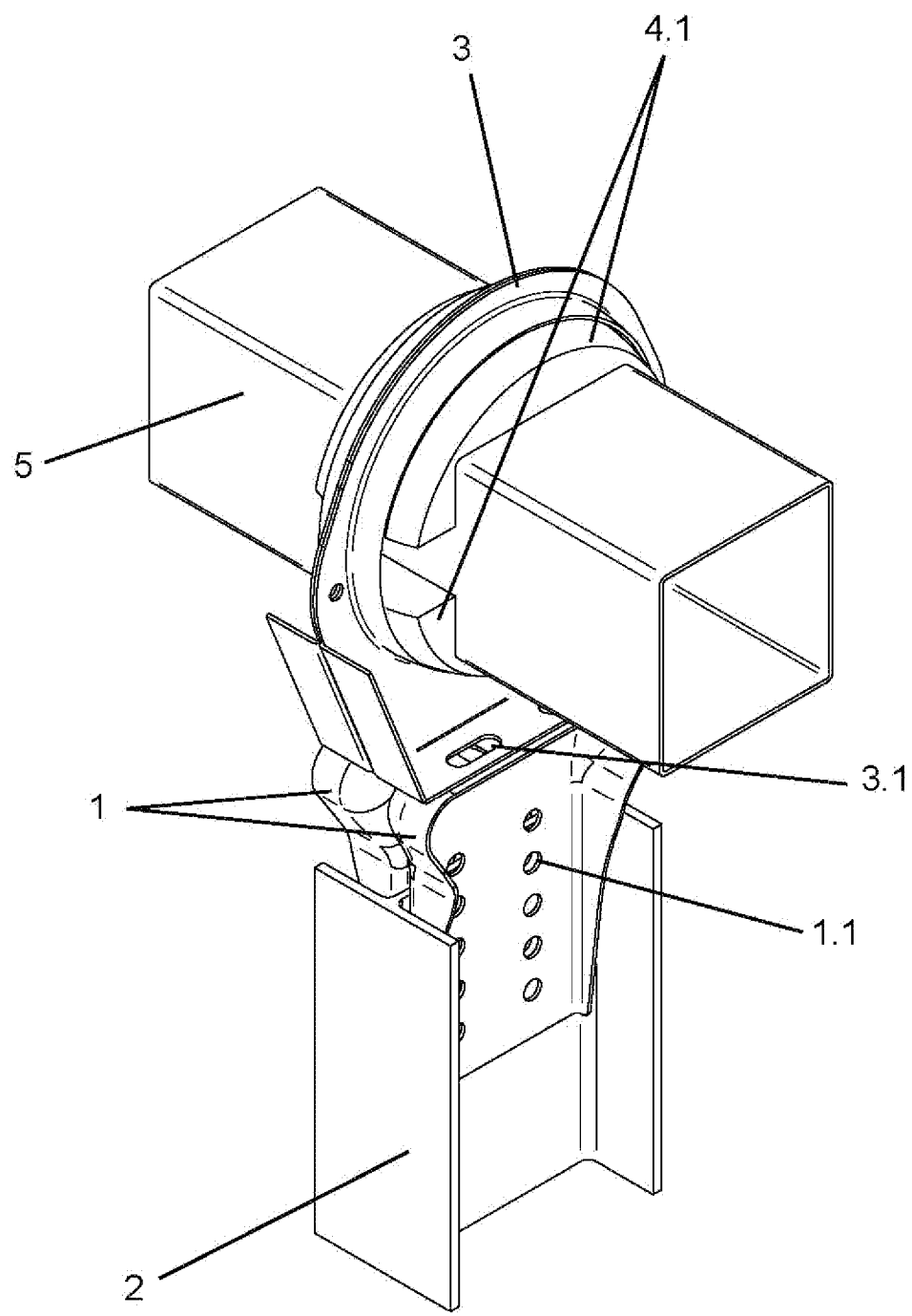
FIG. 3 shows another practical embodiment with another design of a component part of the clamp of the bearing object of the invention.
Figure 4:
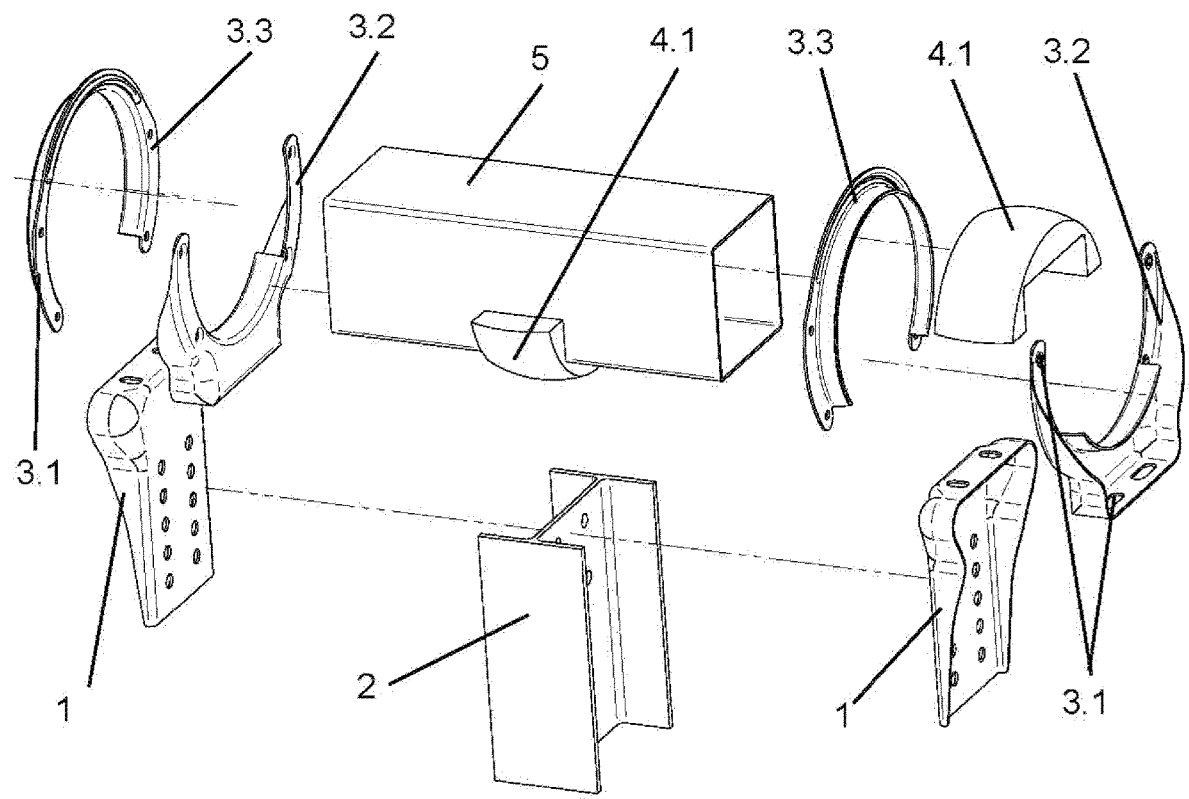
FIG. 4 is an exploded view of a practical embodiment of the clamp of the bearing formed with the annular configuration made up of two complementary sectors.

FIG. 3 shows a practical embodiment in which the clamp (3) has a side reinforcement rib so that the clamp (3) has a higher stress resistance, without any increase in weight.

Figure 5:
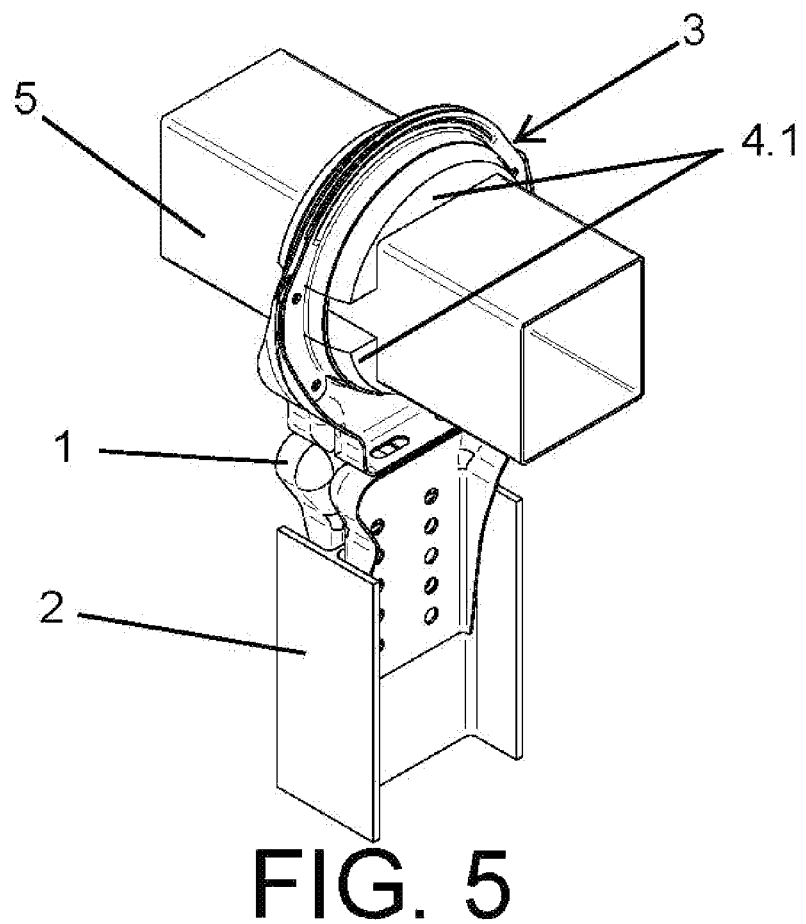
FIG. 5 is a perspective view of the bearing assembled with the clamp formed according to the embodiment of FIG. 4.

To facilitate assembly, an embodiment of the clamp (3) with its annular configuration formed by two complementary sectors, as shown in FIG. 5, is furthermore envisaged, thereby forming an annular configuration which can be opened by separating the two sectors (3.2) and (3.3), whereby the assembly on the rotating shaft (5) to be fastened can be performed without having to pass the entire length of said rotating shaft (5) through the bearing, since both the clamp (3) and the ball joint (4.1) can be opened by separating their respective component parts. The rotating shaft (5) is placed on the lower portion of the ball joint (4.1) in turn arranged on the lower portion (3.2) of the clamp (3), and once the rotating shaft (5) is placed, the upper portions of the ball joint (4.1) and the upper portion (3.3) of the clamp (3) are incorporated. The assembly is then closed by means of attaching the sectors (3.2 and 3.3) of the clamp (3) with screws or similar fastening means through perforations (3.1).

Figure 6:
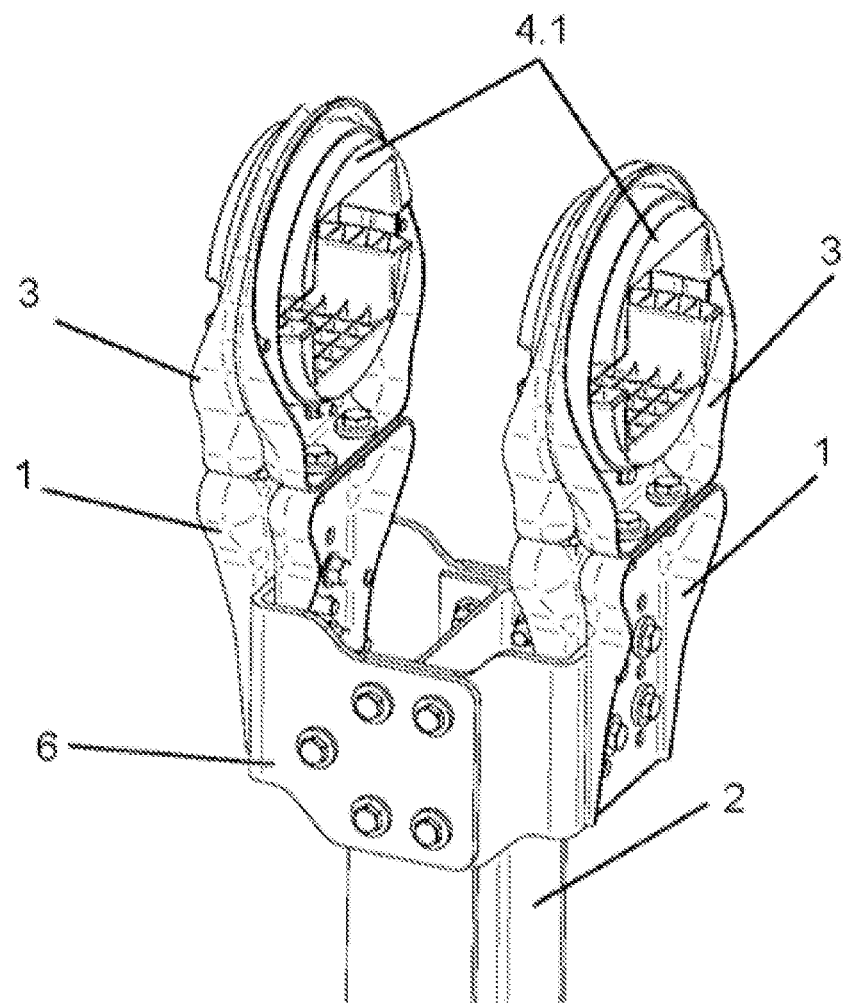
FIG. 6 shows a perspective view of a practical embodiment of a bearing system of the invention with double bearing.

To increase the fastening strength of the rotating shaft (5) to be fastened, thereby allowing the fastening of rotating shafts (5) and application in structures of greater weight and dimensions, a bearing system with double bearing as seen in FIG. 6 is envisaged, using U-shaped attachment parts (6) which are fixed on the post (2) through perforations (6.1). There are incorporated on the mentioned attachment parts (6) respective structured bearings in accordance with the object of the invention according to any one of the embodiments described above, so as to arrange the rotating shaft (5) to be fastened such that it goes through the two bearings thus arranged on the support post (2).

Figure 7:
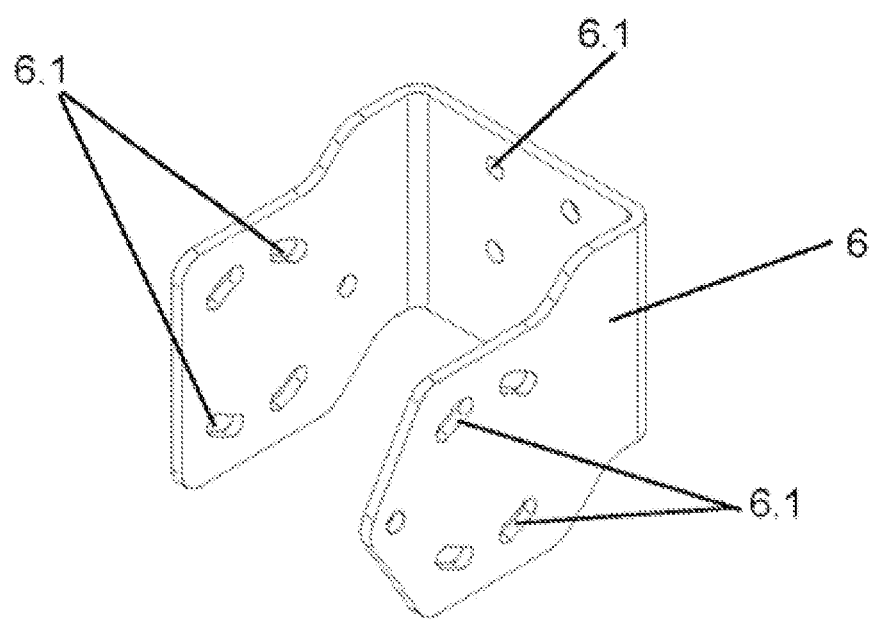
FIG. 7 is a perspective view of a part for fastening the bearings in the double assembly of the preceding figure.

In any case, the design of the attachment parts (6) which are used for fastening the bearings in said double bearing embodiment of FIGS. 6 and 7 is non-limiting, where other types of designs, such as a single part with a square section or the like, can be used, thereby optimizing the number of elements used in said double bearing embodiment.

Moreover, the central opening of the ball joint (4.1) can be designed with any configuration in order to adapt to the different sections of the rotating shafts (5) to be fastened, without this altering the object of the invention.

The invention claimed is:

1. A bearing for fastening rotating shafts on support posts, comprising a support (1) by means of which a clamp (3) is fastened on a support post (2), incorporating in the clamp (3) a spherical ball joint (4.1) through which a rotating shaft (5) to be fastened passes in an axial direction of the rotating shaft, wherein the support (1) is made up of two complementary portions, which are attached facing one another in the axial direction of the rotating shaft, retaining the support post (2) between them, whereas on the assembly of the mentioned support (1) there is fixed the clamp (3) which houses internally the spherical ball joint (4.1) which determines a central opening through which the rotating shaft (5) to be fastened passes, wherein the clamp (3) is made up of two axially facing parts that face each other in the axial direction of the rotating shaft, wherein the two axially facing parts of the clamp (3) can be assembled in the axial direction of the rotating shaft and can be fixed to the corresponding portion of the support (1).

2. The bearing for fastening rotating shafts on support posts according to claim 1, wherein the annular configuration of each of the two axially facing parts of the clamp (3) is made up of two complementary sectors (3.2) and (3.3), which are attached forming an annular configuration defining the housing in which the ball joint (4.1) is incorporated.

3. The bearing for fastening rotating shafts on support posts according to claim 1, wherein the ball joint (4.1) is made up of two complementary portions determining therebetween a central opening having a configuration corresponding with the section of the rotating shaft (5) to be fastened.

4. A bearing system for fastening rotating shafts on support posts, wherein the support post (2) comprises at least one attachment part (6) on which two bearings according to claim 1 are incorporated.

5. The bearing for fastening rotating shafts on support posts according to claim 1, wherein each of the two axially facing parts of the clamp (3) can be individually fixed to a corresponding one of the two complementary portions of the support (1).

* * * * *